March 21, 1950 S. L. WILSON 2,501,250
SUN RAY AND REFLECTED GLARE ARRESTING DEVICE
Filed Sept. 24, 1947 2 Sheets-Sheet 1

INVENTOR:
SAMUEL L. WILSON
BY
ATTORNEY.

March 21, 1950  S. L. WILSON  2,501,250
SUN RAY AND REFLECTED GLARE ARRESTING DEVICE
Filed Sept. 24, 1947  2 Sheets-Sheet 2

INVENTOR.
SAMUEL L. WILSON

ATTORNEY.

Patented Mar. 21, 1950

2,501,250

UNITED STATES PATENT OFFICE 2,501,250

SUNRAYS AND REFLECTED GLARE ARRESTING DEVICE

Samuel L. Wilson, St. Louis, Mo.

Application September 24, 1947, Serial No. 775,777

10 Claims. (Cl. 296—97)

This invention relates to means for arresting direct sun rays and reflected glare shining through transparent windshields and/or side door windows of motor vehicles.

The object of my invention is to provide a device adapted primarily for association with a windshield and/or side door windows of motor vehicles to prevent direct sun rays from shining on the lap of an occupant, or occupants on the driver's seat of the vehicle, preventing thereby the laps of the occupants from getting unbearably hot, fading of the occupants' clothing, providing for more comfortable and cooler riding, and preventing reflected glare from the hood, radiator cap, front fenders and the road affecting the vision of the driver and occupants of the driver's seat.

A further object of the invention resides in providing a device wherein a roller supported curtain can be adjusted within the vehicle body, within limits, so as to assume positions at various angles upwardly and rearwardly and at various elevations relative to a transparent windshield, or the side door windows, as required to arrest direct sun rays and reflected glare from affecting the vision of the occupants of the front seat, thereby making for safer driving, more comfortable, and cooler riding.

A further object of the invention is the provision of brackets, or supports carried by the side members of a windshield frame adapted to carry a roller, a curtain thereon and arcuately movable arms for connection with the corners of the free horizontal edge of the curtain.

A still further object of the invention is the provision of a second roller carried by and between the upper ends of the brackets and provided with a curtain movable up and down independently of the previously mentioned curtain.

A still further object of the invention resides in the provision of a sun and reflected glare arresting device for motor vehicles that is low in cost of manufacture, very simple in construction and operation, and highly efficient for the purposes intended.

The embodiment of the invention herein disclosed is merely illustrative, and may be modified and departed from in non-inventive ways without departing from the spirit and scope of the invention, as pointed out hereinafter, and limited solely by the appended claims.

To the attainment of the above stated objects and others, which will appear as the features of novelty of the invention are better understood, the invention further resides in the novel features of construction, arrangement, combination and association of parts, a practical embodiment of which is disclosed by the accompanying drawings.

Referring to the drawings forming a part of this specification, and wherein like characters of reference denote similar parts throughout the several views.

Figure 1:
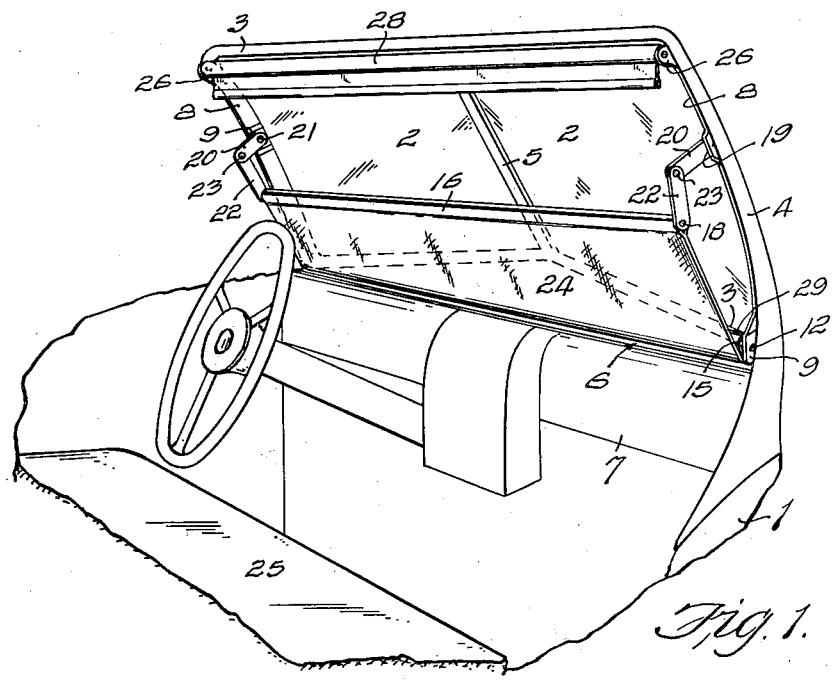
Fig. 1 is a view, in perspective, of the inside of a windshield structure showing a device embodying the features of my invention applied thereto.
Figures 2, 3, 4:
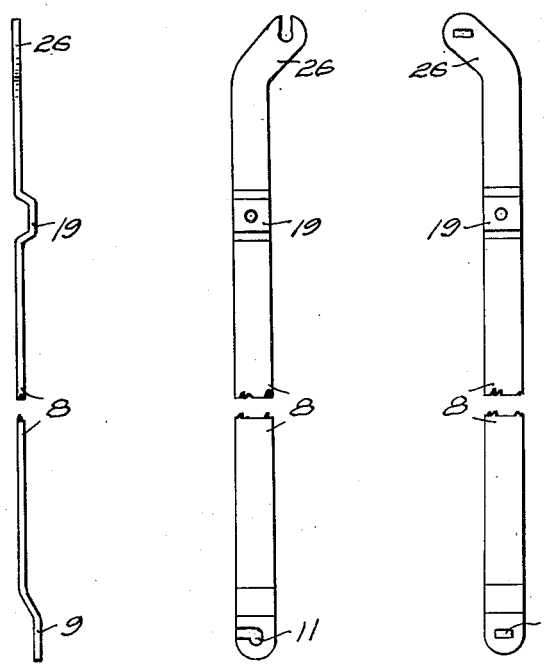
Fig. 2 is a side elevation of one of the supporting brackets.
Fig. 3 is a front elevation of one of the brackets.
Fig. 4 is a front elevation of the other bracket.

Referring to the drawings, a portion of a motor vehicle body is indicated at 1. The body is shown as being provided with transparent windshield members of the conventional V-type construction and designated 2. The windshield members are provided with the usual frame having the upper and lower frame members 3 and side frame member 4 around the edges thereof and a central member 5 between the two glass panels 2 constituting the windshield. The usual shelf-like member 6 is shown as lying between the upper edge portion of the usual instrument panel 7 and the lower frame member 3 of the windshield structure.

A pair of suitable supporting brackets designated, generally, as 8, are suitably secured to the side frame members 4, one to each member.

The brackets 8 each include a lower offset portion 9, one having a rectangular slot 10 and the other having a circular opening 11. The offset portion 9 of each bracket is arranged to lie adjacent the lower end of the side frame members 4. A suitable conventional shade roller 12, spring actuated in one direction of rotation in the usual manner, is carried by and between the offset portions 9 of the brackets 8 so as to lie adjacent to and spaced from the forward edge of the shelf-like member 6 and the upper edge of the instrument panel 7. One end of the roller 12 carries a flat projecting member 13 receivable in the rectangular slot 10 in the offset portion 9 of one of the brackets 8, and the other end of the roller carries a pin 14 receivable in the opening 11 in the offset portion 9 of the other, or opposite bracket 8.

Figure 5:
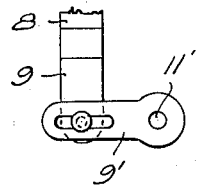
Fig. 5 is a modified form of roller supporting fixture carried by one of the supporting brackets.

In the modification shown in Fig. 5, a member 9' having a circular opening 11' for receiving one end of the spring roller 12, may be adjustably supported by the lower end of one of the brackets 8 where it is desirable to move the spring roller 12 into various positions relative to the lower end of the bracket 8.

Figure 6:
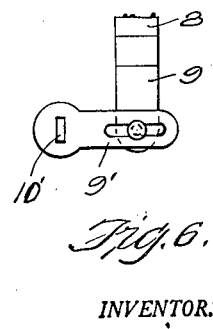
Fig. 6 is a modified form of roller supporting fixture carried by the other supporting bracket.
Figure 7:
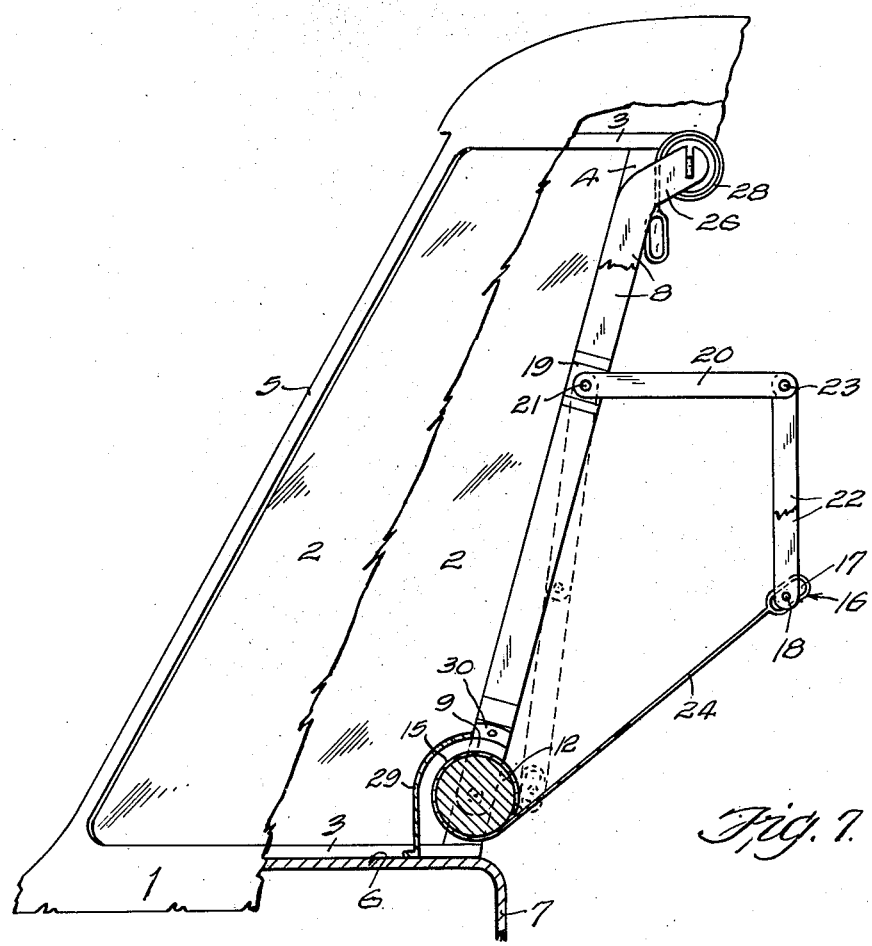
Fig. 7 is a view partly in side elevation and partly in section of windshield section of a motor vehicle body showing the device embodying the features of my invention.
Figure 8:
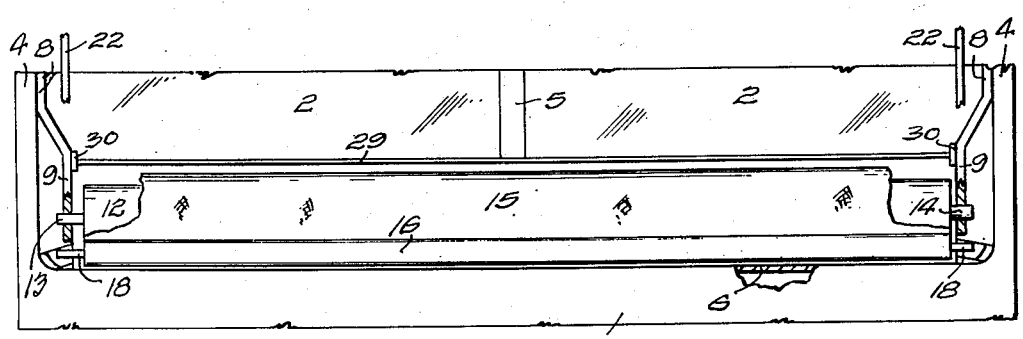
Fig. 8 is a rear elevation of the lower ends of the supporting brackets by and between which a curtain roller is supported.

In the modification shown in Fig. 6, a spring roller supporting member 9' having a rectangular opening 10' for receiving the opposite end of the spring roller 12 may be adjustably supported by the lower end of the other bracket 8 where it is desirable to move the spring roller 12 into various positions relative to the lower end of the bracket 8.

A suitable flexible sun and reflected glare arresting element, or curtain 15, preferably, although not necessarily, of curtain fabric, or roller shade material, is wound upon the roller 12. The free horizontal edge portion 16 of the curtain 15 carries a resilient flexible element 17 provided at its end with suitable outwardly projecting pins 18. When the curtain is not in use, the horizontal free edge is adapted to lie adjacent the lower juncture of the shelf-like member 6 and the instrument panel 7.

Each bracket 8 is further provided with an offset portion 19 at a suitable point intermediate the ends thereof to which, in one embodiment of the invention, an arcuately movable arm 20 is suitably hinged, or pivoted, as at 21.

A second arm 22 is suitably hinged, or pivoted, as at 23, at its inner end to the outer end of arm 20. The hinged, or pivotal connections 21 and 23 are preferably of such a structure as to set up sufficient friction so that the arms 20 and 22 will remain in any of their selected adjusted positions against vibrations set up when the motor vehicle is moving on a road surface.

The free end of each arm 22 has suitable connection with the pins 18 at the ends of the member 17 at the free horizontal edge portion 16 of the curtain 15 for supporting the free horizontal edge portion of the curtain 15 at any desired and selected position rearwardly and upwardly relative to the roller 12 and providing thereby a stretched sun ray and reflected glare arresting panel portion 24 so arranged as to prevent sun rays from shining upon the laps of occupants of the driver's seat 25 of a motor vehicle, providing thereby cooler driving, and preventing reflected glare from the hood, fenders, and road surface from affecting the vision of the driver and occupants of the driver's seat and providing thereby safer driving of motor vehicles due to the fact that the horizontal free edge portion 16 of the curtain 15 can be moved to various positions and elevations within a range of at least ninety degrees and more, if desired.

The upper end of each bracket 8 is provided at its upper end with a supporting portion 26 which is offset to the rear of the longitudinal axis of each bracket. A suitable roller 27 carrying a suitable curtain 28 is rotatably carried by the bracket portions 26 and arranged therebetween so that the curtain 28 can be lowered or pulled down a desired distance between the upper end portions of the two brackets 8.

In order to prevent sun rays from shining between the lower side of the lower curtain roller 12 and the shelf-like member 6, I employ a suitable sun arresting member 29, which is arranged in advance of the roller 12 between the lower ends of the brackets 8 and suitably seated upon the shelf-like member 6. The ends of the member are secured to the brackets, as at 30.

From actual use, it is found that the sun rays are arrested by the stretched curtain panel portion 24 and that reflected glare is arrested so that the vision of the driver is not affected thereby, even without the use of the upper curtain 28, which in fact takes the place of the present inner two spaced apart and adjustable sun visors as standard parts of motor vehicles.

By adjusting both curtains, the lower one upwardly and rearwardly from its roller and the upper one downwardly more or less parallel to the central windshield frame member 5, any desired width of sight opening can be provided to suit the driver's wishes.

The many advantages of the herein described invention will readily suggest themselves to those skilled in the art to which the invention relates.

What I claim is:

1. In combination, a supporting structure in the form of a frame around the edges of a transparent panel and shelf-like member lying between the upper edge of an instrument panel of a motor vehicle and the lower member of the frame, a pair of suitable brackets secured to the side members of the frame, the lower ends of the brackets being offset and having openings therein, a spring roller actuated in one direction of rotation having end projections receivable in the openings in the offset portion of the brackets so that the roller will be supported by and between the brackets adjacent to and spaced from the juncture of the shelf-like member with the instrument panel, a suitable curtain wound around the roller, a flexibly resilient member at the horizontal free edge of the curtain, an offset portion intermediate the ends of each bracket, arms pivotally connected with the latter offset portions to support the free horizontal edge of the curtain in selected adjusted positions rearwardly and upwardly from the roller, and sun rays arresting means seated on the shelf-like member in advance of the roller.

2. In combination, a supporting structure in the form of a frame around the edges of a transparent panel associated with an automobile body, a pair of supporting brackets suitably secured to the frame in opposed spaced relation, each bracket having a lower offset portion having an opening therein, a roller having end projecting elements receivable in said openings for supporting the roller between said offset portions, a curtain wound around the roller and the roller being spring rotated in the winding direction of the curtain, a flexibly resilient member carried by the free horizontal edge of the curtain, adjustable arms carried by the brackets, and said arms having connection with the ends of the flexibly resilient member for holding the free horizontal edge of the curtain at selected elevations to the rear of the roller.

3. In combination, an automobile window frame, a pair of brackets secured to the side members of the frame, a spring roller supported by and arranged between the lower ends of the brackets, a curtain wound around the roller, hingedly connected members connecting the ends of the horizontal free edge of the curtain with the brackets intermediate their upper and lower ends, and said members allowing inward, upward and rearward movement of the horizontal free edge of the curtain to various elevated positions relative to the roller.

4. A combination as defined in claim 3, including a shield open to the rear side thereof detachably supported by and arranged between the lower ends of the brackets and in front of the spring roller.

5. A sun ray and reflected glare curtain fixture comprising a pair of brackets adapted to be secured to the side members of a windshield frame, each bracket consisting of an elongated member, an offset curtain roller support adjacent the lower end thereof, and an offset portion intermediate the ends of each bracket, and adjustable arms pivotally connected to the last mentioned offsets.

6. In a fixture as defined in claim 5, wherein the upper end portions of the brackets are offset rearwardly and provided with openings, a spring roller, and pintles projecting from the ends of the roller receivable in said openings.

7. In combination, a sun ray and reflected glare arresting device for automobile windshields, of a pair of brackets each having spaced lower and upper offset portions adapted to be secured to the side members of the windshield, a roller supported by and between the lower offset portions, flexible sun ray and reflected glare arresting means carried by the roller, adjustable arms pivotally connected with the upper offset portions, the free ends of which are detachably connected with corners of the free horizontal edge of the arresting means.

8. In combination, an automobile window frame, a pair of brackets secured to the side members of the frame, flexible means supported by and arranged between the lower ends of the brackets with the horizontal free edge thereof movable upwardly and rearwardly to arrest sun rays and reflected glare from the automobile body shining through the window, adjustable means supported by and intermediate the ends of the brackets for holding the horizontal free edge of the flexible means at a selected elevation, and a roller shade supported by and between the upper ends of the brackets.

9. A sun-ray and reflected glare device for automobiles having a windshield, an instrument panel and a shelf-like portion between the base of the windshield and the upright portion of the instrument panel, comprising a lower shade of flexible material which may be raised relative to the lower edge of the windshield, an upper shade of flexible material which may be lowered relative to the upper edge of the windshield, spring rollers upon which the shades are wound, a pair of spaced supporting brackets each having a rearwardly projecting upper end portion, an offset lower end portion and an offset portion intermediate the ends of each bracket, the spring roller for the lower shade being supported by and between the offset portions at the lower ends of the brackets, the spring roller for the upper shade being supported by the rearwardly projecting upper end portions of the brackets, hinge members pivotally connected at their outer ends with the offset portions intermediate the ends of the brackets, hinge members pivotally connected at their outer ends with the ends of the free horizontal edge of the lower shade, and hinge pins connecting the inner ends of the hinge members so that the hinge members may be moved into various positions relative to each other and the lower shade moved into various angles relative to the windshield.

10. A device as defined in claim 9, including a sun arresting member open to the rear and top thereof and seated on the shelf-like portion between the lower spring roller and the windshield and connected at its ends with the lower offset portions of the supporting brackets.

SAMUEL L. WILSON.

REFERENCES CITED

The following references are of record in the file of this patent:

UNITED STATES PATENTS

| Number | Name | Date |
| --- | --- | --- |
| 1,566,646 | Brewster et al. | Dec. 22, 1925 |
| 1,594,238 | Benton | July 27, 1926 |
| 1,762,480 | Marenti | June 10, 1930 |